United States Patent
Mirpuri et al.

(10) Patent No.: US 6,523,247 B2
(45) Date of Patent: Feb. 25, 2003

(54) MOTOR STATOR WITH LOOSE LAMINATIONS

(75) Inventors: Gobind P. Mirpuri, Decatur, AL (US); G. Russell Woodruff, Jr., Hartselle, AL (US)

(73) Assignee: Copeland Corporation, Sidney, OH (US)

( * ) Notice: Subject to any disclaimer, the term of this patent is extended or adjusted under 35 U.S.C. 154(b) by 151 days.

(21) Appl. No.: 09/753,828

(22) Filed: Jan. 3, 2001

(65) Prior Publication Data

US 2002/0083572 A1 Jul. 4, 2002

(51) Int. Cl.[7] .............................................. H02K 15/02
(52) U.S. Cl. .............................. 29/596; 29/606; 29/609; 29/732; 414/27; 414/788
(58) Field of Search ......................... 29/596, 598, 606, 29/609, 732, 736; 310/42, 154, 156; 414/27, 788

(56) References Cited

U.S. PATENT DOCUMENTS

| | | | |
|---|---|---|---|
| 3,629,925 A | * 12/1971 | Brown et al. | 29/596 |
| 3,821,846 A | * 7/1974 | Pleiss et al. | 29/596 |
| 4,188,712 A | 2/1980 | Burns | |
| 4,316,692 A | * 2/1982 | Schwab | 414/27 |
| 4,464,826 A | 8/1984 | Bair | |
| 4,559,698 A | * 12/1985 | Bair et al. | 29/598 |
| 4,574,460 A | 3/1986 | Bair | |
| 5,015,155 A | 5/1991 | Brown | |
| 5,047,745 A | 9/1991 | Marriott et al. | |
| 5,062,200 A | * 11/1991 | Lanfranco | 29/732 |
| 5,918,359 A | * 7/1999 | Neuenschwander | 29/564.2 |
| 6,006,417 A | * 12/1999 | Brown et al. | 29/596 |

* cited by examiner

Primary Examiner—David P. Bryant
Assistant Examiner—Stephen Kenny
(74) Attorney, Agent, or Firm—Harness, Dickey & Pierce, P.L.C.

(57) ABSTRACT

A motor stator is constructed from loose laminations which are aligned and secured to the compressor housing at the time of assembling the compressor unit. The loose lamination stator is first attached to the compressor housing to initially locate the stator. A solid sizing mandrel is pushed through the rotor accommodating bore to remove any burrs and initially size the bore. An expanding mandrel is then positioned within the rotor accommodating bore and expanded to finalize the sizing of the bore and the alignment with the compressor housing. Once the final size and alignment have been achieved, the stator is secured to the motor housing.

14 Claims, 7 Drawing Sheets

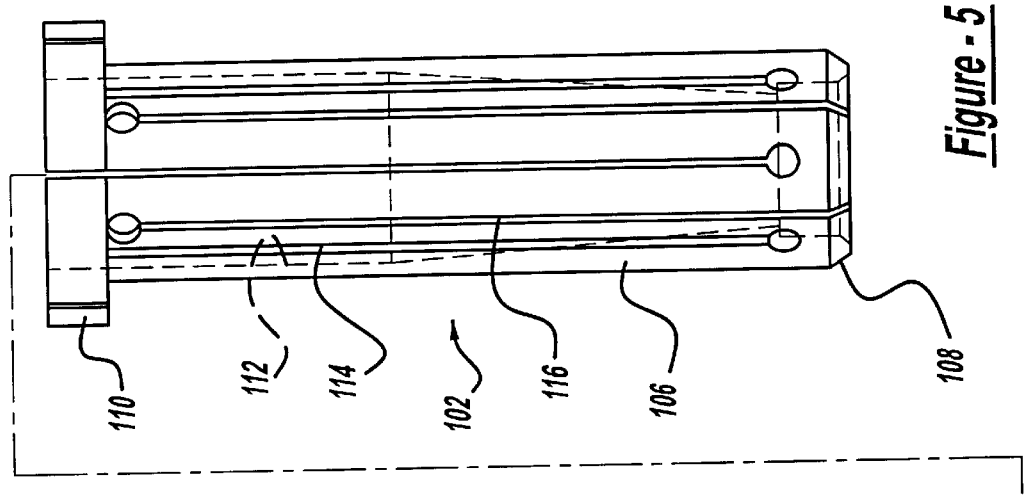
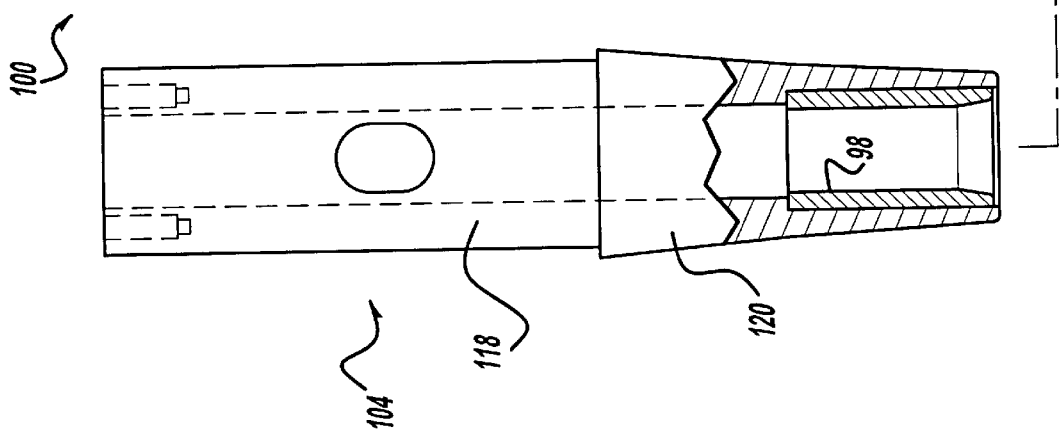
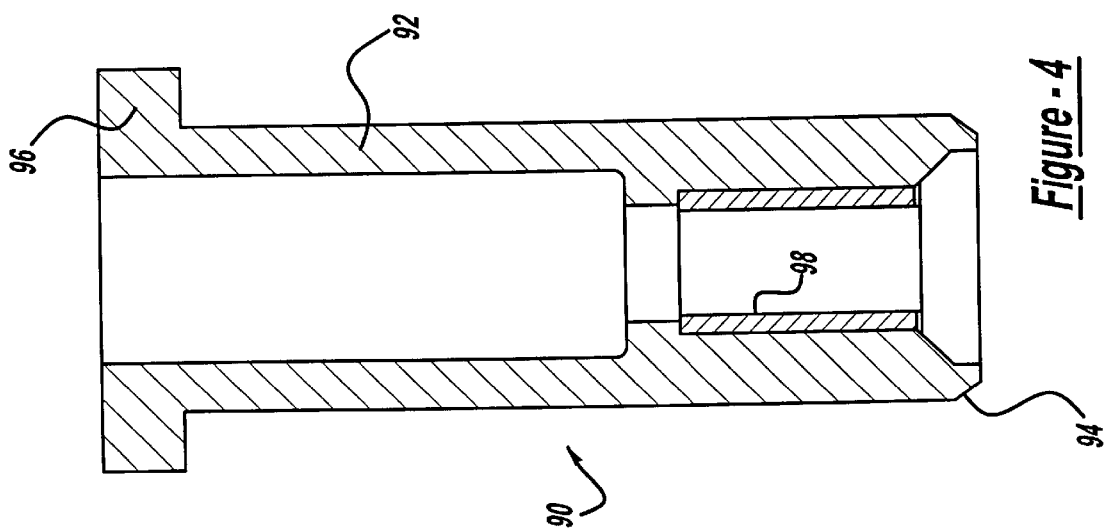

MOTOR STATOR WITH LOOSE LAMINATIONS

FIELD OF THE INVENTION

The present invention relates to motor stators created from packs of laminations. More particularly, the present invention relates to a motor stator created from packs of loose laminations where the center bore of the motor stator is drawn to size during the assembly of the motor.

BACKGROUND OF THE INVENTION

Hermetic refrigeration compressors normally incorporate a compressor and an associated electrically driven motor within a hermetically sealed shell. The electric motor will generally include a rotor secured to a drive shaft journaled in the compressor housing or other suitable bearing means and a stator secured to the compressor housing by means of bolts extending through the stator core.

The stator core for these electric motors generally compress a plurality of stacked laminations bonded together by welding, varnishing or other means of bonding the individual laminations together. A set of windings is wound through the assembled stator core to produce the stator. The stator is mounted to a plurality of mounting pads or surfaces machined on the inner surface of the compressor housing. The stator is secured to the compressor housing using a plurality of bolts which are threadingly received by the compressor housing. The bonding of the laminations prior to assembly of the stator enables the correct alignment for the stator. The securing of the stator to the compressor housing results in a cantilever mounting arrangement for the stator in that only one end thereof is fastened to the compressor housing and the other end extends upwardly.

It is important to have the plane defined by the machined surfaces on the compressor housing perpendicular to the axis of the rotor when the rotor is installed. In order to accomplish this, it is necessary that the rotor accommodating bore of the stator core be perpendicular to the lower surface of the stator core itself, since it is this lower surface which is supported on the machined surfaces of the compressor housing. The proper positioning of the rotor accommodating bore of the stator core ensures that the air gap between the stator and rotor of the electric motor will be very uniform along the entire axial length of the electric motor. In many hermetic compressor applications, the rotor is supported at only one end thereof, and normally at the same end where the stator is connected to the compressor housing. Because of this cantilevered supporting arrangement for the rotor, although it is relatively easy to maintain an accurate air gap at the end nearest the bearing, normal flexing and deflection of the rotor at the opposite end will result in a wider variance in the air gap, taking into consideration normal machining and bearing tolerances. Accordingly, in order to minimize as much as possible the error in the air gap at the stator core furthest from the mounting surface of the compressor housing, it is necessary that the rotor accommodating bore be very accurately aligned perpendicular to the reference plane defined by the mounting surfaces on the compressor housing.

The plurality of laminations that make up the stator core can be a preassembled unit or they can be a plurality of loose individual laminations which are stacked up at the time of assembling the electric motor. When a preassembled unit is produced, the laminations are stacked together, aligned and then bonded together by welding, varnishing or by other means for bonding. The assembled units can have their rotor accommodating bore aligned during the assembling and securing operation or the rotor accommodating bore can be machined after assembly of the laminations. Once the stator core has been completed, the stator windings can be added to the core to produce the motor stator. The disadvantages to the preassembled stator cores include, but are not limited to, the relatively high costs associated with the alignment, the bonding and the subsequent machining of the rotor accommodating bore.

In order to improve the quality of the electric motors and reduce their costs, the industry has turned to the assembling of loose individual stator laminations into the stator cone and then adding the stator winding to this assembly of loose stator laminations. The problem to be solved, when assembling loose laminations, is to align the individual stator core laminations in such a manner that a very accurate size and perpendicularity of the rotor accommodating bore is achieved, not only at the bottom of the stack, but also at the top of the stack.

One prior art method for the assembling of stators having the loose individual stator laminations and the appropriate stator windings is to place the stator on the compressor body with the bolts extending through the loose stator laminations and loosely threadingly engaging the compressor body. An expanding mandrel is then placed through the center of the stator. The expanding mandrel is then expanded to form the final shape of the rotor accommodating bore. The expansion of the mandrel aligns the loose stack of stator laminations and the expansion of the mandrel will shear and/or crush any burrs which might be located within the bore. The individual bolts are then tightened to hold the stator laminations in place and to secure the stator.

While the above procedure has worked well for small fractional horse power electric motors, it does not work that well for the larger electric motors required for refrigeration compressors. The main reason for the failure of the above procedure is due to the large forces required to expand the mandrel to align all the laminations at once including the removal of any burrs. The large forces required for the above procedure create the possibility that the assembled stator will deform which results in a defective electric motor.

Thus, the continued development of the large motors needed for the refrigeration compressors includes the development of methods which will allow the use of the lower cost loose lamination electric motors for these large compressors.

SUMMARY OF THE INVENTION

The present invention provides the art with a method which makes it possible to utilize the lower cost loose lamination electric motors for the larger horse power electric motors required for the refrigeration industry. Prior to this unique method, the use of loose lamination electric motors was not possible for the larger compressors. The method comprises first assembling the loose lamination stator with the appropriate wiring to the compressor body using the bolts that extend through the stator core and then loosely threading the bolts into the compressor body. A solid mandrel is then pushed through this assembly. The solid mandrel is the same size or slightly smaller than the rotor accommodating bore formed in the individual laminations. This solid mandrel aligns the laminations one at a time while simultaneously repositioning the copper wire and the plastic liners and the solid mandrel pre-forms the rotor accommodating bore by shearing off and/or deforming any burrs that may be located within the bore. The solid mandrel is removed, a positioning pin is inserted into one of the open bolt holes and an expanding mandrel is inserted and expanded to form the final shape of the rotor accommodating bore. The expanding mandrel is then collapsed and re-expanded to secure the laminations in place while the bolts are tightened. The bolts hold the laminations in place to maintain the final bore shape. This two step alignment and forming process significantly reduces the loads of any single forming process thus allowing the use of the loose lamination stators for the higher horse power electric motors required for refrigeration compressors.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 4 is a cross-sectional view of the solid mandrel which aligns the loose laminations;

FIG. 5 is a cross-sectional view of the expanding sleeve and arbor of the expanding mandrel;

DETAILED DESCRIPTION OF THE PREFERRED EMBODIMENT

Figure 1:
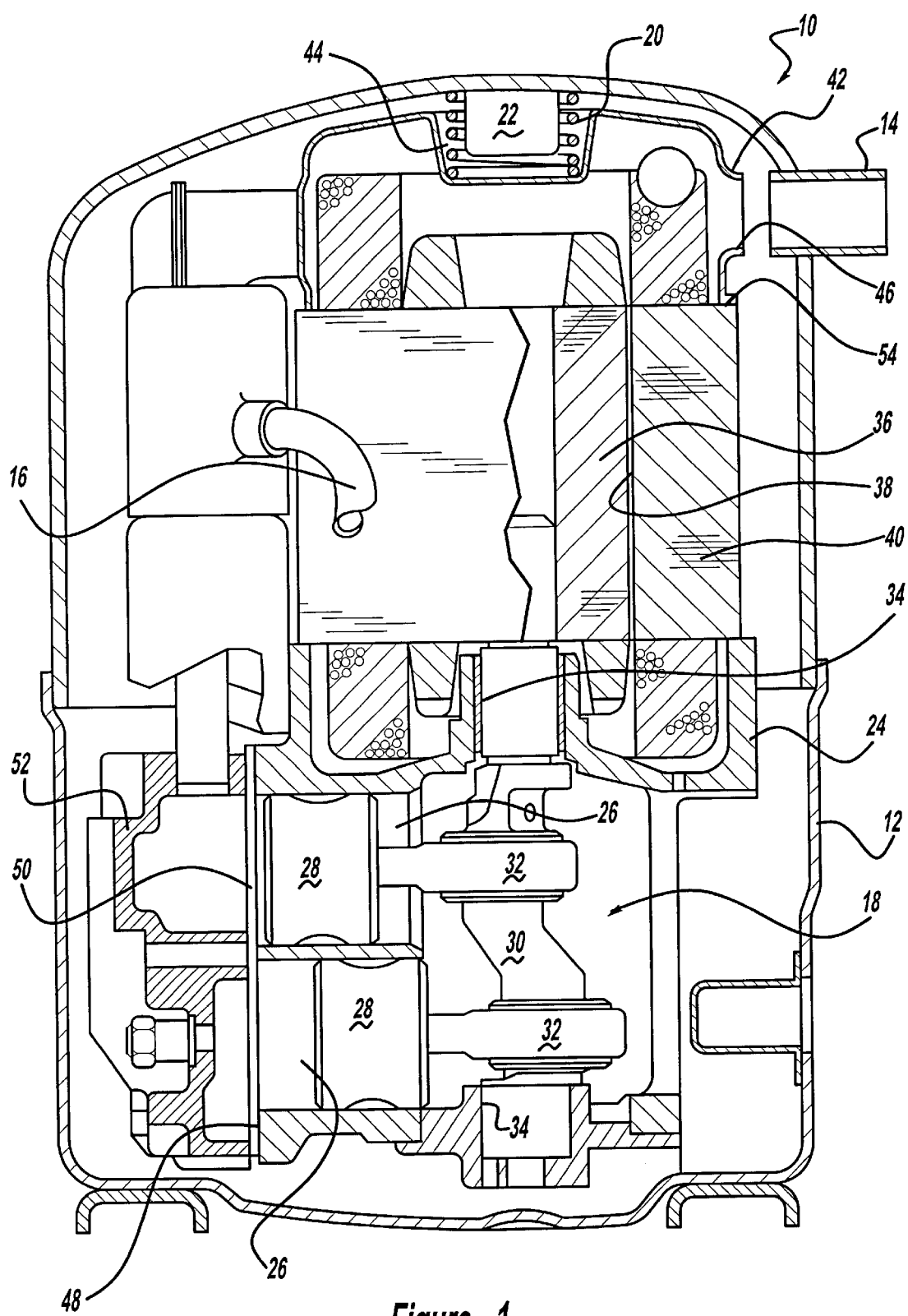
FIG. 1 is a vertical sectional view of a hermetic refrigeration compressor which includes the loose lamination stator in accordance with the present invention.

Referring now to the drawings in which like reference numerals designate like or corresponding parts throughout the several views, there is shown in FIG. 1 a refrigerant compressor which includes a loose lamination stator in accordance with the present invention and which is designated generally by the reference numeral 10. Refrigerant compressor 10 comprises a hermetic shell 12, a suction gas inlet 14, a discharge tube 16 and a motor-compressor unit 18. Motor compressor unit 18 is spring supported in the usual manner (not shown) and positioned at the upper end by means of a spring 20 located on a sheet metal projection 22. Motor compressor unit 18 comprises a compressor housing 24 defining a plurality of pumping cylinders 26 (two parallel radially disposed cylinders in this case). A reciprocating pumping member is disposed in each cylinder 26 in the form of a piston 28 connected in the usual manner to a crankshaft 30 by a connecting rod 32. Crankshaft 30 is rotationally journaled in a pair of bearings 34 disposed within housing 24. The upper end of crankshaft 30 is affixed to a motor rotor 36 rotatively disposed within a bore 38 defined by a motor stator 40. The upper end of motor stator 40 is provided with a motor cover 42 which has a recess 44 receiving spring 20 and an inlet opening 46. Inlet opening 46 is positioned to receive suction gas entering through inlet 14 for the purposes of motor cooling prior to induction into the compressor. Each cylinder 26 in housing 24 is opened to an outer planar surface 48 on housing 24 to which is bolted the usual valve plate assembly 50 and cylinder head 52, all in the usual manner.

Figure 2:
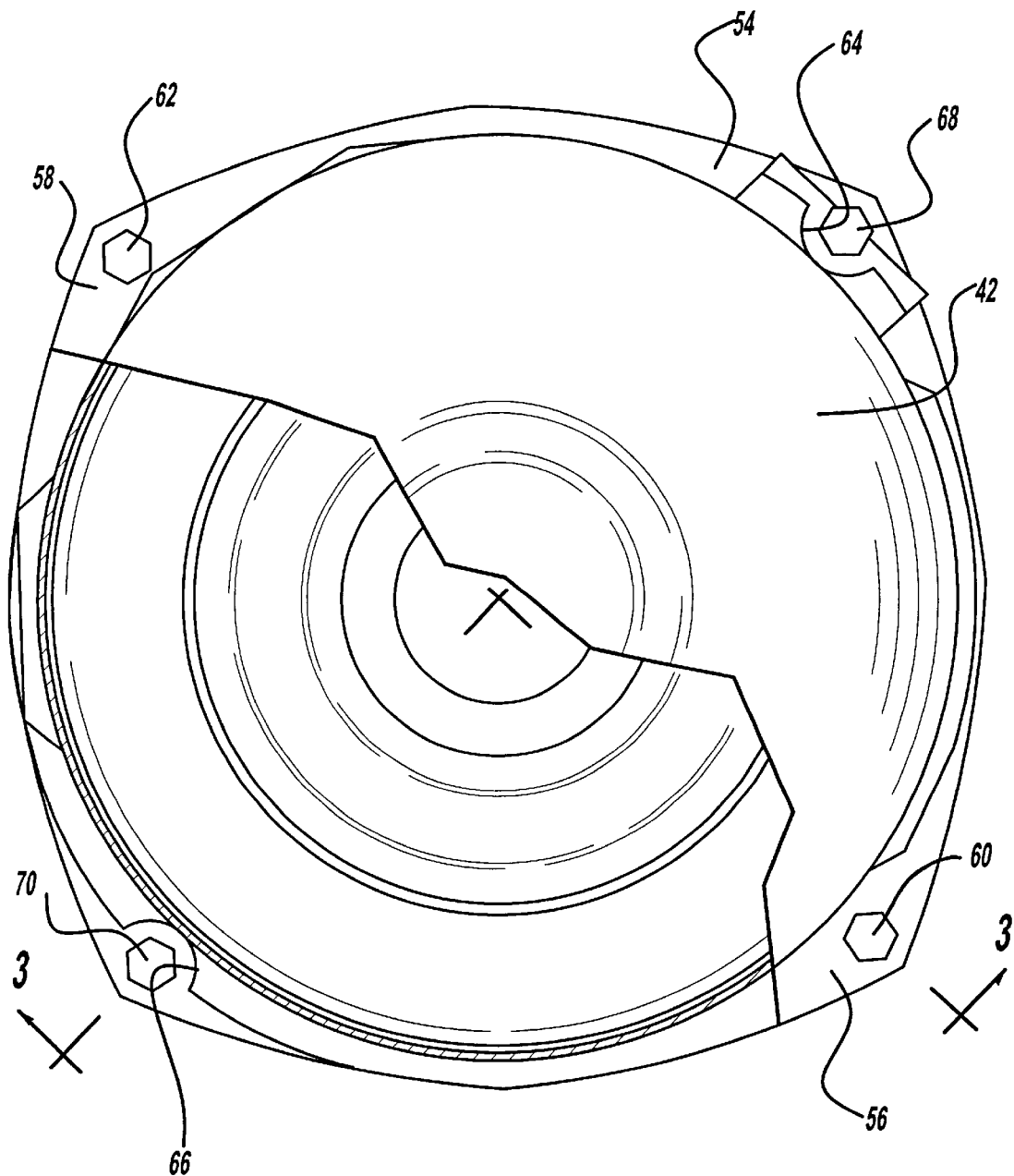
FIG. 2 is a top plan view of the motor cover, the loose laminated stator and rotor shown in FIG. 1.
Figure 3:
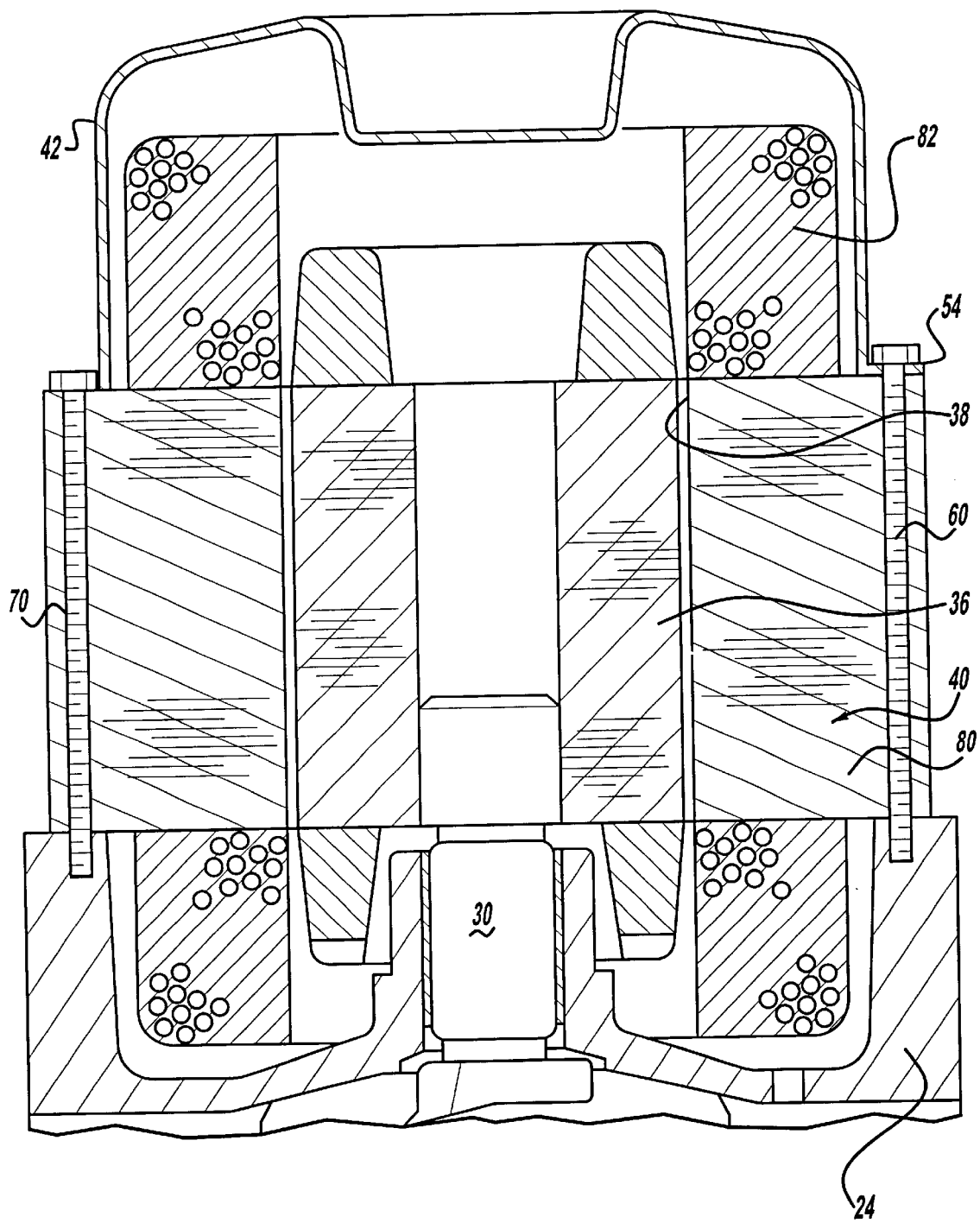
FIG. 3 is a fragmentary cross-sectional view of the compressor and electric motor taken in the direction of arrows 3—3 in FIG. 2.

Referring now to FIGS. 2 and 3, motor cover 42 is generally cup-shaped and it includes a peripheral flange portion 54 adapted to seat on the upper end of stator 40. Flange portion 54 includes a pair of diametrically opposed extensions 56 and 58 which serve to accommodate openings for a pair of bolts 60 and 62, respectively. Also, a pair of diametrically opposed recesses or cut out portions 64 and 66 are provided on flange portion 54 offset approximately 90° from respective extensions 56 and 58. Recesses 64 and 66 serve to provide a clearance for stator securing bolts 68 and 70, respectfully.

The assembling of motor-compressor unit 18 includes positioning motor stator 40 on housing 24 and centering stator 40 so that a uniform gap is provided between bore 38 and rotor 36. Thereafter, stator securing bolts 68 and 70 are tightened thereby locking stator 40 in position so as to assure the above noted uniform air gap is maintained. Next, motor cover 42 may be positioned in overlying relationship to the upper end of stator 40 with recess portions 64 and 66 aligned with previously tightened stator securing bolts 68 and 70. Thereafter, stator securing bolts 60 and 62 are inserted through openings provided in extensions 56 and 58 of motor cover 42, through holes in stator 40 and into threaded engagement with compressor housing 24 to secure motor cover 42 and stator 40 to housing 24.

The present invention is directed towards a unique apparatus and method for providing the uniform gap discussed above when a loose lamination stator 40 is used. Stator 40 comprises a plurality of loose stator laminations 80 and stator windings 82. In the prior art, laminations 80 of stator 40 are aligned at the time of assembly of windings 82 and are bonded in alignment by welding, varnishing or other bonding means. The bonding of laminations 80 defined bore 38. Thus, the prior art method used to provide the uniform air gap was to set the position of bore 38 in relation to bearing 34 which journals crankshaft 30 and thus motor rotor 36. The present invention utilizes motor stator 40 having the plurality of laminations 80 loose thus requiring both the creation and alignment of bore 38.

Referring now to FIG. 4, a non-adjustable or solid mandrel 90 is disclosed. Solid mandrel 90 includes a body 92 which is sized to be the same size or just slightly smaller than the diameter needed for bore 38. Preferably, a clearance of one-thousandth (0.001) of an inch is provided between the outside diameter of body 92 and the inside diameter of bore 38. A lead-in chamfer 94 is provided at one end of mandrel 90 and a connecting flange 96 is provided at the opposite end. Body 92 defines an internal bore within which is positioned a bushing 98. Bushing 98 is designed to engage the end of crankshaft 30 which aligns mandrel 90 with crankshaft 30 to properly align stator 40 as detailed below.

Referring now to FIG. 5, an expanding mandrel 100 is disclosed. Mandrel 100 includes an expandable sleeve 102 and an arbor 104. Sleeve 102 includes a body 106 which is sized to be slightly smaller than the diameter of bore 38. A lead in chamfer 108 is provided at one end of sleeve 102 and a connecting flange 110 is provided at the opposite end. Body 106 defines an internal bore which defines a frustoconical shaped surface 112 which interfaces with arbor 104 as described below. Body 106 also defines a plurality of axial extending slots 114 which extend from the chamfered end of body 106 towards the flanged end. Interleaved with slots 114 are a plurality of axially extending slots 116 which extend from the flanged end of body 106 towards the chamfered end. Slots 114 and 116 provide for the expansion of sleeve 102 due to the engagement with arbor 104.

Arbor 104 includes a body 118 which is designed to be inserted into the internal bore of sleeve 102. The exterior surface of body 118 defines a frusto-conical surface 120 which is designed to engage frusto-conical shaped surface 112 of body 106 of sleeve 102. The engagement between surfaces 120 and 112 expands body 106 of sleeve 102 due to the presence of slots 114 and 116. Body 118 defines an internal bore within which another bushing 98 is disposed. Bushing 98 is designed to engage the end of crankshaft 30 which aligns mandrel 100 with crankshaft 30 to properly align stator 40 as detailed below.

Figure 6:
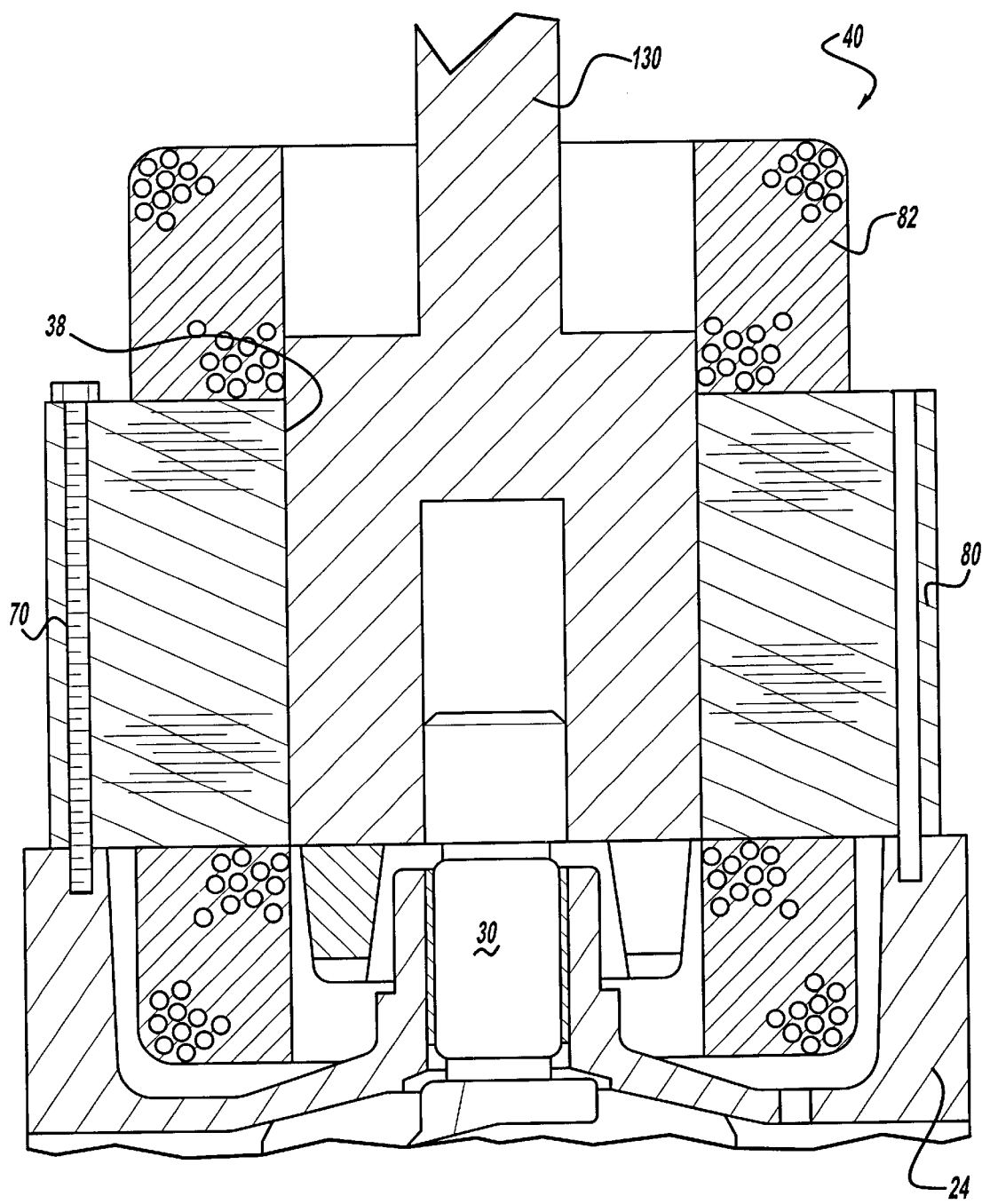
FIG. 6 is a cross-sectional view showing the assembly of the loose lamination stator and the compressor body.

Referring now to FIGS. 3 and 6–8, the assembly of stator 40 to compressor housing 24 will be described. Stator 40 is provided with laminations 80 being loose or in an unbonded condition. Each lamination 80 is manufactured using a stamping press or a piece of similar equipment. Thus, when producing laminations 80, any distortion and/or thickness variation in laminations 80 will be relatively consistent. If all of laminations 80 are stacked in the same orientation, the distortion and/or thickness variation will become additive adding to the misalignment of laminations 80. The present invention reduces and/or eliminates the build-up of distortion and/or thickness variation by dividing the total number of laminations 80 into four groups identified as A, B, C and D in FIG. 6. By keeping track of the orientation of each lamination 80 coming from the stamping press, Group B can be orientated 180° with respect to Group A, Group C can be orientated 180° with respect to Group B (the same orientation as Group A) and Group D can be orientated 180° with respect to Group C (180° with respect to Group A). In this manner, any distortion and/or thickness variation in laminations 80 is circumferentially spread out over the entire stack of laminations 80 providing a more uniform stack of laminations 80. While the present application is being described with four groups of laminations, it is within the scope of the present invention to have more than four groups, if desired. Once circumferentially stacked, laminations 80 are loosely held by windings 82. Loose laminate stator 40 is placed on compressor housing 24 and bolts 68 and 70 are inserted through stator 40 and loosely threaded into compressor housing 24 as shown in FIG. 6. Bolts 60 and 62 are not assembled at this time. A "dummy" rotor 130 is inserted into bore 38 and it engages the end of crankshaft 30 extending through bearing 34. Dummy rotor 130 positions loose laminate stator 40 with respect to compressor housing 24 and crankshaft 30.

Figure 7:
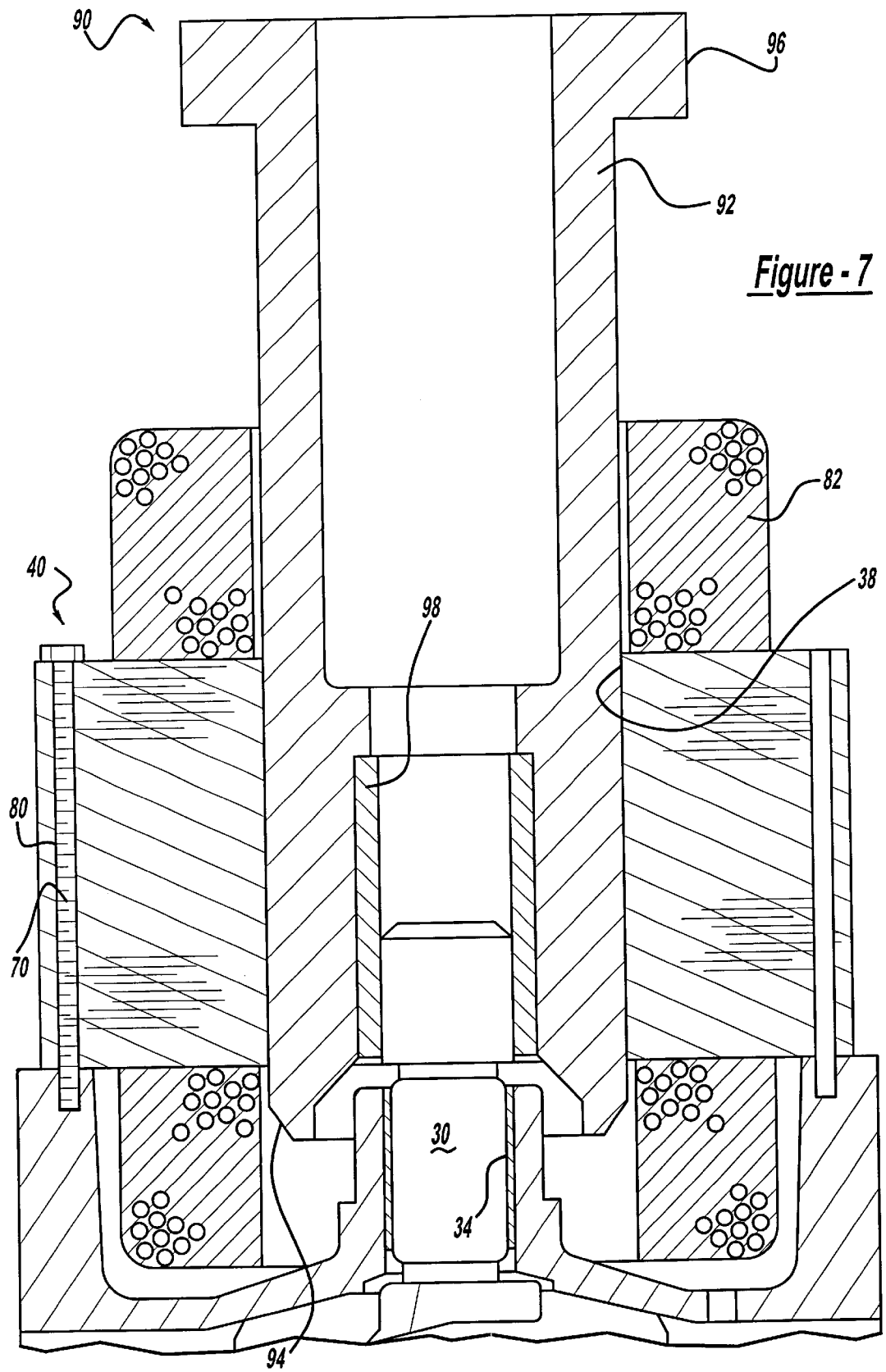
FIG. 7 is a cross-sectional view of the solid mandrel in the process of aligning the loose laminations.

Next, as shown in FIG. 7, solid mandrel 90 is pushed through bore 38 of stator 40. Chamfer 94 guides mandrel 90 into bore 38 which aligns laminations 80 one at a time while simultaneously repositioning windings 82 and the plastic liners (not shown) disposed between laminations 80 and windings 82. Because body 92 of mandrel 90 is sized to be just slightly smaller than bore 38, burrs on laminations 80 are forced to either shear off or they ride up on top of each other one at a time. As mandrel 90 finishes its stroke and thus its alignment, bushing 98 engages the end of crankshaft 30 to again align stator 40 at a position where bore 38 is concentric with the end of crankshaft 30.

Figure 8:
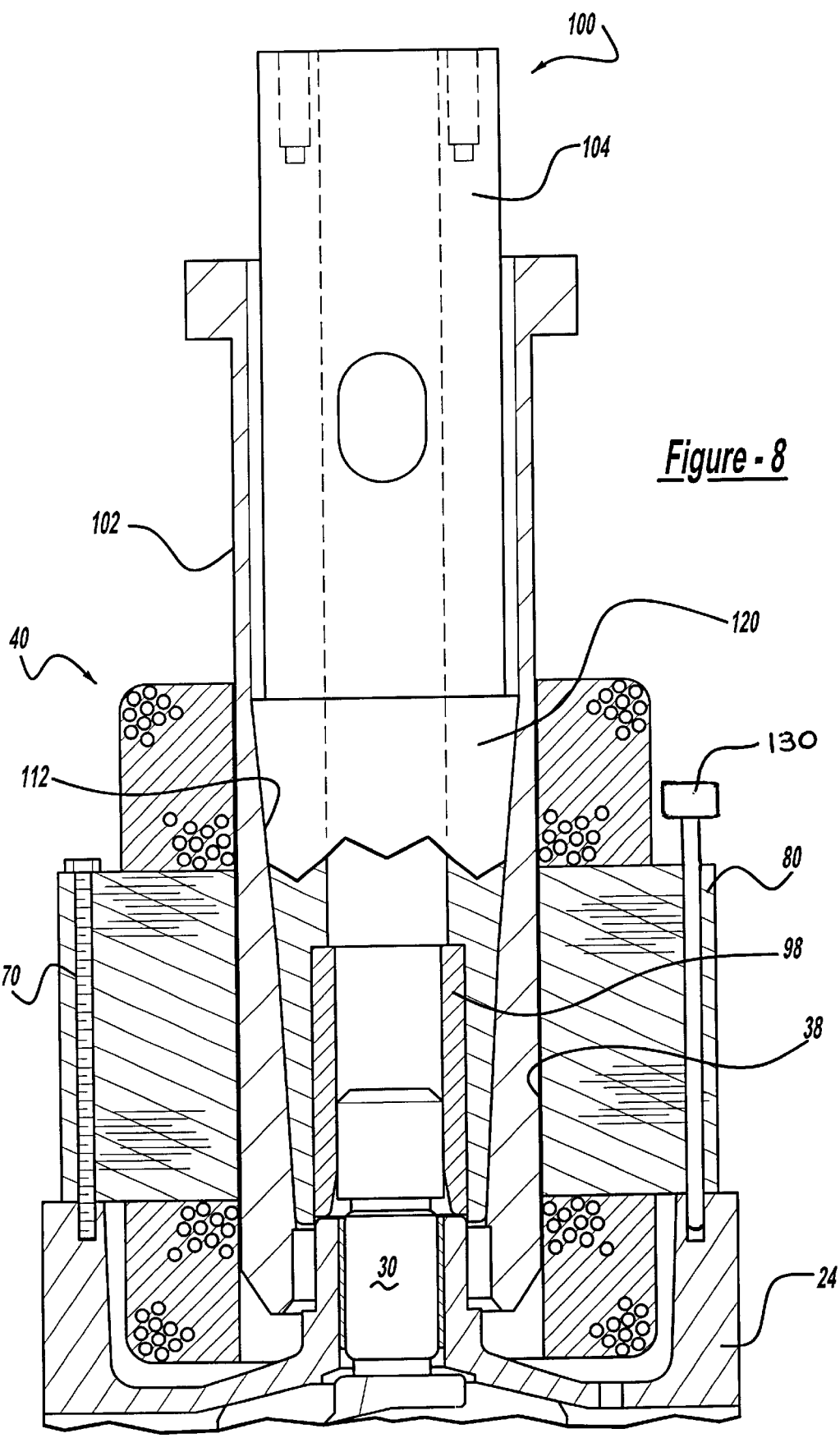
FIG. 8 is a cross-sectional view of the expanding mandrel forming the rotor accommodating bore.

Next, as shown in FIG. 8, expanding mandrel 100 is inserted into bore 38 in a collapsed or unexpanded condition and a locating pin 30 is inserted into one of the open bolt bores extending through laminations 80 of stator 40. Locating pin 130 is designed to be slightly larger in diameter than the diameter of bolts 60 and 62 and will thus provide a pivoting point for laminations 80 during the sizing process described below. Sleeve 102 extends entirely through bore 38 and arbor 104 is disposed within the central bore of sleeve 102. Arbor 104 is then moved axially with respect to sleeve 102 causing surface 120 to engage surface 112 causing the expansion of sleeve 102. Sleeve 102 expands due to slots 114 and 116. Sleeve 102 expands until the final bore shape for bore 38 is achieved. As arbor 104 extends axially into sleeve 102, its bushing 98 engages the end of crankshaft 30 to again align stator 40 at a position where bore 38 is concentric with the end of crankshaft 30.

Expanding mandrel 100 is then collapsed by reversing arbor 104 and then expanding mandrel 100 is re-expanded by again reversing arbor 104. During the re-expansion of mandrel 100, a lower pressure is used to move arbor 104. As arbor 104 extends axially into sleeve 102 the second time, its bushing 98 again engages the end of crankshaft 30 to finalize the alignment of stator 40 at a position where finished bore 38 is concentric with the end of crankshaft 30.

Bolts 68 and 70 are then tightened to hold laminations 80 in place. Expanding mandrel 100 and locating pin 130 are removed. Motor rotor 36 is heated and shrunk fit onto the end of crankshaft 30. Finally, motor cover 42 is installed over stator 40 and bolts 60 and 62 are inserted through cover 42, through stator 40 and threaded into compressor housing 24. Bolts 60 and 62 are tightened to complete the assembly as shown in FIG. 3.

The above method provides a system for utilizing loose lamination stators in the higher horse power electric motors without generating the typical prior art large forces which have the capability of deforming the stator which resulted in a defective electric motor.

While the above detailed description describes the preferred embodiment of the present invention, it should be understood that the present invention is susceptible to modification, variation and alteration without deviating from the scope and fair meaning of the subjoined claims.

What is claimed is:

1. A method of assembling a motor stator having an inner surface defining a rotor bore to a housing, said method comprising:

positioning said motor stator on said housing;

inserting a non-adjustable mandrel within said rotor bore, an outer surface of said non-adjustable mandrel engaging said inner surface of said motor stator which defines said rotor bore;

removing said non-adjustable mandrel from said rotor bore;

inserting an expandable mandrel within said rotor bore;

expanding said expandable mandrel within said rotor bore;

securing said motor stator to said housing.

2. A method of assembling a motor stator having a rotor bore to a housing, said method comprising:

positioning said motor stator on said housing;

inserting a non-adjustable mandrel within said rotor bore;

removing said non-adjustable mandrel from said rotor bore;

inserting an expandable mandrel within said rotor bore;

expanding said expandable mandrel within said rotor bore;

securing said motor stator to said housing;

wherein said housing includes a crankshaft bore and a crankshaft extending through said crankshaft bore and into said rotor bore, and said step of positioning said motor stator on said housing includes inserting a dummy rotor into said rotor bore to engage said crankshaft.

3. A method of assembling a motor stator having a rotor bore to a housing, said method comprising:
positioning said motor stator on said housing;
inserting a non-adjustable mandrel within said rotor bore;
removing said non-adjustable mandrel from said rotor bore;
inserting an expandable mandrel within said rotor bore;
expanding said expandable mandrel within said rotor bore;
securing said motor stator to said housing;
wherein said housing includes a crankshaft bore and a crankshaft extending through said crankshaft bore and into said rotor bore, and said step of inserting said non-adjustable mandrel within said rotor bore includes engaging said crankshaft with said non-adjustable mandrel.

4. A method of assembling a motor stator having a rotor bore to a housing, said method comprising:
positioning said motor stator on said housing;
inserting a non-adjustable mandrel within said rotor bore;
removing said non-adjustable mandrel from said rotor bore;
inserting an expandable mandrel within said rotor bore;
expanding said expandable mandrel within said rotor bore;
securing said motor stator to said housing;
wherein said housing includes a crankshaft bore and a crankshaft extending through said crankshaft bore and into said rotor bore, and said step of inserting said expandable mandrel within said rotor bore includes engaging said crankshaft with said expandable mandrel.

5. A method of assembling a motor stator having a rotor bore to a housing, said method comprising:
positioning said motor stator on said housing;
inserting a non-adjustable mandrel within said rotor bore;
removing said non-adjustable mandrel from said rotor bore;
inserting an expandable mandrel within said rotor bore;
expanding said expandable mandrel within said rotor bore;
securing said motor stator to said housing;
wherein said step of positioning said motor stator on said housing includes inserting a dummy rotor into said rotor bore.

6. The method according to claim 1, further comprising the step of collapsing said expandable mandrel prior to securing said motor stator to said housing.

7. The method according to claim 6, further comprising the step of re-expanding said expandable mandrel after collapsing said expandable mandrel and prior to securing said motor stator to said housing.

8. The method according to claim 1, wherein said motor stator comprises a plurality of loose laminations and said step of inserting said non-adjustable mandrel includes the step of aligning said plurality of loose laminations.

9. The method according to claim 8, wherein the step of inserting said non-adjustable mandrel includes the step of deburring said rotor bore.

10. A method of assembling a motor stator having a rotor bore to a housing, said method comprising:
positioning said motor stator on said housing;
inserting a non-adjustable mandrel within said rotor bore;
removing said non-adjustable mandrel from said rotor bore;
inserting an expandable mandrel within said rotor bore;
expanding said expandable mandrel within said rotor bore;
securing said motor stator to said housing;
wherein the step of inserting said non-adjustable mandrel includes the step of deburring said rotor bore.

11. The method according to claim 1, wherein the step of expanding said expandable mandrel includes the step of sizing said rotor bore.

12. The method according to claim 1, further comprising the step of stacking a plurality of loose laminations to create said motor stator.

13. The method according to claim 12, wherein the step of stacking said plurality of loose laminations includes stacking a plurality of groups of laminations with each group being circumferentially orientated with respect to an adjacent group.

14. The method according to claim 13, wherein the step of stacking a plurality of groups of laminations comprises stacking four groups of laminations each orientated 180° with respect to said adjacent group.

* * * * *